United States Patent [19]

Kunz

[11] Patent Number: 4,722,409
[45] Date of Patent: Feb. 2, 1988

[54] COMPACT WEIGHING APPARATUS OF THE ELECTROMAGNETIC LOAD COMPENSATION TYPE

[76] Inventor: Peter Kunz, Saumstrasse 28, CH-8625 Gossau, Switzerland

[21] Appl. No.: 50,406

[22] Filed: May 18, 1987

[30] Foreign Application Priority Data

Jun. 6, 1986 [CH] Switzerland ............ 02309/86

[51] Int. Cl.$^4$ .................................. G01G 7/00
[52] U.S. Cl. ........................ 177/212; 177/210 EM
[58] Field of Search .................. 177/210 EM, 212

[56] References Cited

U.S. PATENT DOCUMENTS

| 4,373,596 | 2/1983 | Kunz | 177/212 |
| 4,382,480 | 5/1983 | Knothe et al. | 177/212 |
| 4,429,757 | 2/1984 | Kunz | 177/212 |
| 4,503,923 | 3/1985 | Maaz | 177/212 |
| 4,545,448 | 10/1985 | Kunz | 177/212 |

FOREIGN PATENT DOCUMENTS 3401857 8/1985 Fed. Rep. of Germany.

Primary Examiner—George H. Miller, Jr.
Attorney, Agent, or Firm—Laubscher & Laubscher

[57] ABSTRACT

A compact weighing apparatus of the electromagnetic load compensation type is disclosed including a permanent magnet system having a U-shaped soft iron yoke, and a pair of highly coercive permanent magnets of parallelepiped configuration mounted in opposed relation between the adjacent surfaces of the leg portions of the yoke. The compensation coil is mounted for movement between, and in a direction parallel with, the yoke leg portions, the coil having a rectangular cross sectional configuration to define longer coil turn sides arranged adjacent the magnets, respectively. The lever that connects the compensation coil with the load receiving member contains a stepped recess that receives at least a portion of one of the load receiver guide means, thereby to achieve further compactness of the components of the weighing apparatus.

13 Claims, 5 Drawing Figures

COMPACT WEIGHING APPARATUS OF THE ELECTROMAGNETIC LOAD COMPENSATION TYPE

BRIEF DESCRIPTION OF THE PRIOR ART

This invention relates to an electrical scale with a permanent magnet system that is placed upon a base or stand carrying the scale and that is of generally U-shaped design, and a rectangular coil for load compensation which is arranged between the legs of the premanent magnet system and through which current flows, and a load receiver which is connected with the coil via a lever.

Scales of this kind are known in the art, as evidenced, for example, by the prior Kunz U.S. Pat. No. 4,373,596, 4,429,757, and 4,545,448, each assigned to the same assignee as the present invention.

In German application No. DE-Al No. 3,401,857, a microscale is disclosed having two rectangular compensation coils arranged at the ends of a two-arm lever, respectively, said coils each having segments arranged in the fields of fixed permanent magnet systems. The permanent magnet systems consist of U-shaped iron yokes, having leg portions arranged parallel to, and at a short interval from, the two longer legs of the coils and which include a centrally arranged pole plate which sits on top of a parallelepiped block consisting of magnetic material and which is inserted into the back of the iron yoke.

Permanent magnet systems of the kind described above entail the disadvantage that large stray fields and correspondingly large losses appear. This determines the use of proportionately large and expensive active permanent magnets as a result of which the reduction of the structural height of the scale is considerably limited.

In U.S. Pat. No. 4,503,923 an attempt was made to achieve a low structural height int hat the plate, made of soft iron, which is arranged between the identically poled plates consisting of active magnetic material, is reduced in terms of its diameter, or is entirely omitted, so that the coil will protrude into a space defined between both plates consisting of active magnetic material.

This kind of design undoubtedly facilitates a certain reduction in the structural height; but it calls for large-volume and large-surface magnets. In terms of magnetic performance moreover, it presents a very low efficiency.

The present invention was developed to overcome the above and other drawbacks of the weighing scales of the prior art.

SUMMARY OF THE INVENTION

The present invention solves the problem of creating an electrical scale in which—by using small quantities of active magnetic material relative to the volume of the iron core—a major reduction in the structural height of the scale is possible without loss of accuracy.

This problem is solved according to the invention in that the permanent magnet system includes two parallelepiped permanent magnets that are arranged on the inside of the legs of the U-shaped soft-iron yoke, and that the coil has a rectangular configuration defining longer coil turn sides arranged parallel to the permanent magnets.

The advantages achieved by the invention are to be seen essentially in that the structural height is determined only by the height (i.e., axial length) of the coil, and the dimensions of the iron core that receives the coil. This arrangement furthermore includes a very small stray field so that one can generate a strong counterforce with very little output due to the small losses.

The possibility of a very high induction in the soft-iron part that protrudes into the coil, permits the design of a rectangular coil in which the shorter coil turn sides, which are arranged outside the active air gap, are considerbly shorter than the segments that are located inside the active air gap.

BRIEF DESCRIPTION OF THE DRAWING

Other objects and advantages of the invention will become apparent from a study of the following specification, when viewed in the light of the accompanying drawings, in which.

DETAILED DESCRIPTION

Figure 1:
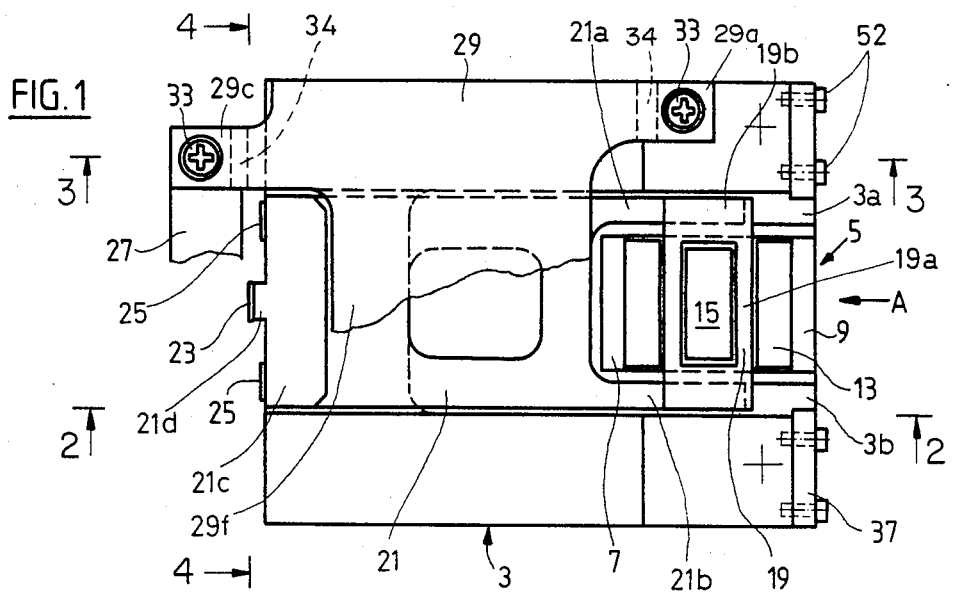
FIG. 1 is a top plan view, with certain parts borken away for purpose of illustration, of the weighing apparatus of the present invention.

In the top-pan weighing apparatus shown and described in the following example, certain parts, such as the indicator part, the casings, and the scale dish have not been illustrated. The electrical parts are illustrated only to the extent that they are a part of the invention or that they are necessary for its understanding. The design of the conventional parts which are not illustrated is assumed to be known in advance.

Referring now to the drawings, the weighing apparatus of the present invention is of the electromagnetic load compensation type including a base or stand 3 containing a recess 1 that receives the permanent magnet means including a U-shaped soft iron yoke having a central transverse portion 17 and a pair of upwardly extending leg portions 7 and 9. Across the upper free extremities of the leg portions is mounted a horizontally arranged thin soft-iron plate 11 that closes the magnetic stray field of the yoke. On the inner surfaces of each of the yoke leg portions 7 and 9 are mounted (for example, by adhesion) a pair of parallelepiped permanent magnets 13 of high coercivity the major aces of which are horizontal and parallel with each other and with the plate 11. A soft iron center core portion 15 extends upwardly from the transverse yoke portion 17 in parallel spaced relation between the leg portions 7 and 9.

Mounted for movement concentrically about the core center portion 15 in the narrow air gap defined between the magnets 13 and the core center portion is a compensation current coil 19 of rectangular cross-sectional configuration, the larger sides 19a of the coil turns extending adjacent said magnets 13 and parallel with the major axes thereof, and the shorter coil turn sides being arranged generally outside the major flux path.

Coil 19 is carried by the bifurcated end of lever 21 having split end portions 21a, 21b that extend on opposite sides of, and are connected with, the coil 19. At its other end, the lever has a stepped end portion 21c connected for pivotal movment with the base 3 by means of a pair of flexure bearings 25 having horizontal colinear pivot axes. Slight pivotal movement of the lever about the flexure bearings 25 causes coil 19 to move generally axially of the core center portion 15 through a range of about 1–2 mm. Accordingly, the arc described by the coil and the resultant gap width change can be neglected.

Figure 2:
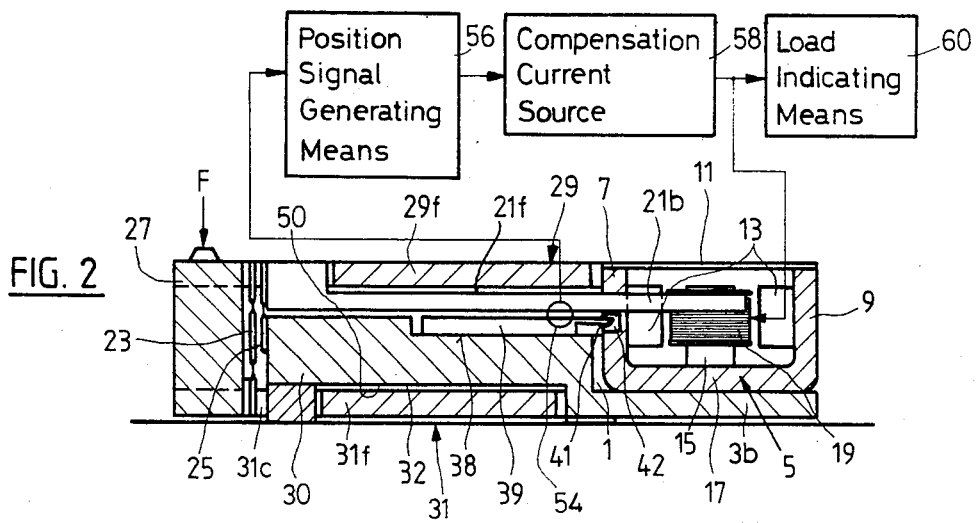
FIGS. 2-4 are sectional views taken along lines 2—2, 3—3 and 4—4, respectively, of FIG. 1.

The stepped portion 21c of the lever has an axial extension 21d to which is connected the upper end of tension connecting rod 23 to lower end of which is connected with load receiver 27. The load receiver 27, which carries the scale pan (not shown) that receives the load force F, is guided for vertical movement relative to the base 3 by parallel upper and lower H-shaped horizontal guide members 29 and 31, respectively. The upper guide member 29 has at opposite end pairs of leg portions 29a, 29b and 29c, 29d, respectively, which leg portions are connected by screws 33 with the base 3 and load receiver member 27, respectively. The upper guide member 21 has a central transverse portion 21f that is received in the recess defined in lever 21 by the stepped end portion 21c. As a result of this compact design, the structural height of the scale housing is determined solely by the length of the leg portions of the U-shaped yoke member 5 and the associated supporting portion of base 3, since the guide members 29 and 31 are completelye mbedded within the structural height of the soft iron yoke. To this end, the central transverse portion 31f of the lower guide member 31 extend within a corresponding recess 50 contained in the bottom of base 3, as shown in FIG. 2.

In order that the thickness of the guides 29 and 31 may be kept as thin as possible, and the thermal characteristic is uniform over the entire working range of the scale, the guides are formed as unitary one-piece members. Thus, there are not joints or connections made of expensive materials that must be attached by screws or rivets, that in turn, are formed of a different material having a different temperature characteristic. The integrated flexure joints are determined by grooves 34 formed in the guide member surface for weakening the same to the extent that flexure in the elastic range of the material is possible.

Figure 3:
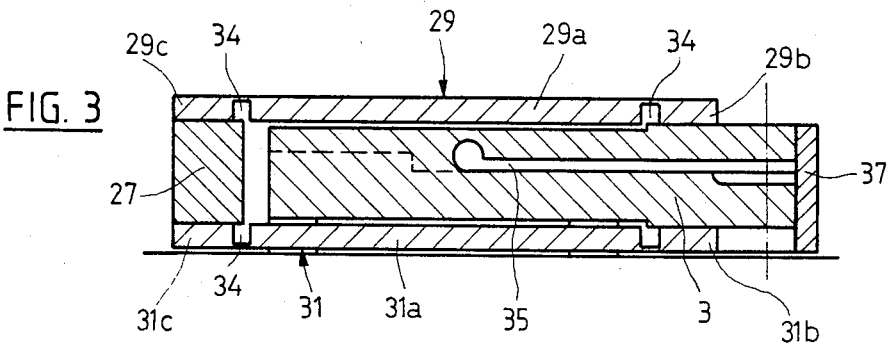
Figure 4:
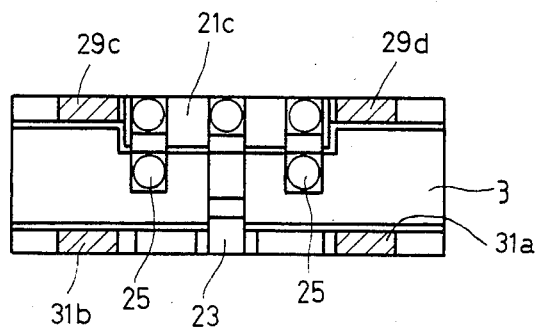
Figure 5:
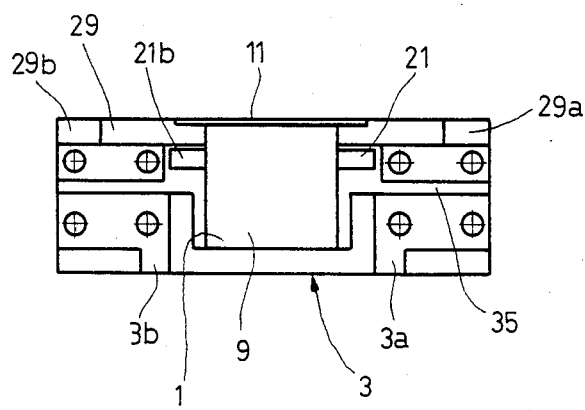
FIG. 5 is a right hand view, with certain parts removed, of the apparatus of FIG. 1 taken in the direction of the arrow A.

For adjustment of the position of guides 39, 31 for corner load adjustment, the base includes a slot 35 (FIG. 3) that extends longitudinally inwardly from the coil end of the base parallel with the guides. Following adjustment of the parallel positioning of the guides by the manufacturer at the factory, (e.g., in a known manner by means of a differential screw, not shown), the portions above and below the slot 35 are secured together by bolts 52 (FIG. 1) and end plates 37.

Mounted within a recess 38 on stand 3 is a printed circuit board 39 that carries part of the electronic circuitry of the scale. At the end of the printed circuit board adjacent the coil, a temperature sensor is provided for measuring the temperature of the soft iron yoke 5. To this end, the sensor extends within a borehole 42 contained in the soft iron yoke.

The stand 3 and the parts assembled thereto form a compact effectively functioning scale which, as a whole, can be built into a corresponding housing, and which generally requires only connection with a suitable analysis part.

Operation

In operation, upon the application of a load F to be weighed to the load receiver 27, the load receiver is initially displaced downwardly guided by the parallelogram formed by resilient guide members 29 and 31. Owing to the associated downward movement of connecting rod 23, lever 21 is pivoted upwardly in the counterclockwise direction about flexure bearings 25, thereby to raise coil 19 relative to the magnetic field produced by permanent magnets 13, As a consequence of the uneven lengths of the arms of the lever on opposite sides of the bearings 25, the coil 19 is displaced a distance that is a multiple of the displacement of the load receiver 27.

As is known in the art, the displacement of load receiver 27 from its initial no-load or zero position is sensed by position sensor means 54 (e.g., of the well-known capacitive type) that is connected with position signal generating means 56 that supplies a position responsive signal to compensating current source 58. The magnitude of compensation current required to restore or maintain the load receiver at the zero position is a measure of the applied load F, as indicated by the load indicating means 60.

What is claimed is:

1. In a weighing apparatus of the electromagnetic load compensation type including a stationary permanent magnet system mounted on a supporting base (3), load receiving means (27) connected for movement relative to said base, a compensation current coil (19) arranged within the magnetic field of said permanent magnet system, and a lever connecting said coil with said load rteceiving means, said lever being connected for pivotal movement relative to said base;

the improvement wherein:
    (a) said permanent magnet system includes:
        (1) a generally U-shaped soft iron yoke member (5) having a transverse portion (17) and a pair of parallel leg portions (7, 9) that extend parallel with, and on opposite sides of, the axis of movement of said coil, and
        (2) a pair of parallelepiped permanent magnets (13) mounted in opposed relation in the adjacent surfaces of said leg portions, respectively; and
    (b) further wherein said compensation current coil is mounted between said yoke leg portions and has a rectangular cross-sectional configuration defining pairs of shorter (19b) and longer (19a) coil turn sides, said longer coil turn sides extending between said permanent magnets adjacent the surfaces thereof, respectively, thereby to effect a compact arrangement of the components of the weighing apparatus.

2. Apparatus as defined in claim 1, and further including guide means for guiding said load receiving means for movement relative to said base, said guide means including a pair of parallel spaced guide members (29, 31) connected at opposite ends with said load receiving means and with said base, respectively.

3. Apparatus as defined in claim 1, wherein said lever means is bifurcated at one end to define a pair of leg portions (21a, 21b) extending on opposite sides of said coil, said lever leg portions being connected with said compensation coil at the shorter sides of the coil turns.

4. Apparatus as defined in claim 2, wherein said guide members each contain pairs of spaced parallel grooves (34) extending parallel with the pivot axis of said lever to define integral flexure bearings in said guide members that connect main (29a, 31a) and end portions (29b, 29c; 31b, 31c) of said guide members, respectively, said guide member end portions being connected with said load receiving means and with said base respectively.

5. Apparatus as defined in claim 1, wherein said permanent magnet means further includes a center core portion (15) arranged within said coil, said center core portion extending from said transverse portion in parallel spaced relation relative to said yoke leg portions.

6. Apparatus as defined in claim 1, wherein the length of the coil is no greater than the corresponding dimensions of the magnets, respectively.

7. Apparatus as defined in claim 1, wherein the width of the leg portions of said U-shaped yoke member corresponds generally with the corresponding dimensions of said magnets, respectively.

8. Apparatus as defined in claim 1, and further including a soft iron sheet (11) connected across the free extremities of the leg portions of said U-shaped yoke member, thereby to close the flux path of said permanent magnet means.

9. Apparatus as defined in claim 4, wherein said lever is stepped to define a recess for at least partially receiving a first one of said guide members (29).

10. Apparatus as defined in claim 9, wherein said guide members are generally H-shaped to define center portions (29f, 31f) extending between pairs of arm portions, respectively, the center portion (29f) of said first guide member being contained in said lever recess.

11. Apparatus as defined in claim 1, wherein said base contains a recess (38) adjacent said lever, and further wherein said weighting apparatus includes electronics means having a printed circuit board (39) mounted in said base recess.

12. Apparatus as defined in claim 11, wherein said electronics means also includes a temperature sensor (41) mounted on said printed circuit board and extending into a corresponding bore-hole (42) contained in said U-shaped yoke member.

13. Apparatus as defined in claim 9, wherein said lever is stepped to define at its outer end a stepped portion (21c), and further including means (25) pivotally connecting said lever outer end with said base.

* * * * *

UNITED STATES PATENT AND TRADEMARK OFFICE
CERTIFICATE OF CORRECTION

PATENT NO. : 4,722,409

DATED : February 2, 1988

INVENTOR(S) : KUNZ, Peter

It is certified that error appears in the above—identified patent and that said Letters Patent is hereby corrected as shown below:

On the Title Page add Item [73]

-- Mettler Instrumente AG, Greifensee, Switzerland --.

Signed and Sealed this

Twenty-sixth Day of July, 1988

Attest:

DONALD J. QUIGG

Attesting Officer

Commissioner of Patents and Trademarks